US011823634B2

(12) United States Patent
DeWall et al.

(10) Patent No.: US 11,823,634 B2
(45) Date of Patent: Nov. 21, 2023

(54) ADAPTIVE BRIGHTNESS FOR AUGMENTED REALITY DISPLAY

(71) Applicant: Snap Inc., Santa Monica, CA (US)

(72) Inventors: Jeffrey Michael DeWall, Arvada, CO (US); Alexander Kane, Vienna (AT); Dominik Schnitzer, Vienna (AT); Mathieu Emmanuel Vignau, Los Angeles, CA (US)

(73) Assignee: SNAP INC., Santa Monica, CA (US)

( * ) Notice: Subject to any disclaimer, the term of this patent is extended or adjusted under 35 U.S.C. 154(b) by 0 days.

(21) Appl. No.: 17/582,633

(22) Filed: Jan. 24, 2022

(65) Prior Publication Data

US 2022/0398986 A1 Dec. 15, 2022

Related U.S. Application Data

(60) Provisional application No. 63/208,810, filed on Jun. 9, 2021.

(51) Int. Cl.
*G09G 3/34* (2006.01)
*G02B 27/01* (2006.01)
(Continued)

(52) U.S. Cl.
CPC ....... *G09G 3/3406* (2013.01); *G02B 27/0101* (2013.01); *G02B 27/0172* (2013.01);
(Continued)

(58) Field of Classification Search
USPC ........................................................ 345/690
See application file for complete search history.

(56) References Cited

U.S. PATENT DOCUMENTS 8,970,571 B1* 3/2015 Wong ................ G02F 1/133621
345/207
2004/0227456 A1* 11/2004 Matsui ................ H04N 9/3182
313/501
(Continued)

FOREIGN PATENT DOCUMENTS

WO WO-2022260954 A1 12/2022

OTHER PUBLICATIONS

"International Application Serial No. PCT/US2022/032175, International Search Report dated Sep. 26, 2022", 5 pgs.
(Continued)

*Primary Examiner* — Chineyere D Wills-Burns
(74) *Attorney, Agent, or Firm* — SCHWEGMAN LUNDBERG & WOESSNER, P.A.

(57) ABSTRACT

Disclosed are systems and methods for adaptively adjusting brightness of a wearable device projection system. The systems and methods perform operations comprising: causing projection elements of the AR wearable device to project an image; receiving a measure of ambient light from an ambient light sensor; adjusting one or more hardware parameters of the projection elements of the AR wearable device based on the measure of ambient light; modifying one or more color values of the image displayed by the projection elements of the AR wearable device based on the measure of ambient light; and projecting the image with the modified color values using the projection elements of the AR wearable device with the adjusted one or more hardware parameters.

20 Claims, 9 Drawing Sheets

(51) Int. Cl.
*G09G 3/32* (2016.01)
*G09G 5/02* (2006.01)
*G09G 3/00* (2006.01)
*G06F 3/147* (2006.01)

(52) U.S. Cl.
CPC ........ G09G 3/32 (2013.01); *G02B 2027/0118* (2013.01); *G02B 2027/0178* (2013.01); *G09G 2320/0626* (2013.01); *G09G 2320/0666* (2013.01); *G09G 2360/144* (2013.01)

(56) References Cited

U.S. PATENT DOCUMENTS

| | | | | |
|---|---|---|---|---|
| 2009/0278828 A1* | 11/2009 | Fletcher | | G09G 3/3406 |
| | | | | 455/566 |
| 2012/0019493 A1* | 1/2012 | Barnhoefer | | H05B 41/3922 |
| | | | | 345/207 |
| 2012/0021393 A1* | 1/2012 | Thorn | | A63B 71/0622 |
| | | | | 434/247 |
| 2013/0147778 A1* | 6/2013 | Ninan | | G09G 3/3426 |
| | | | | 345/207 |
| 2014/0063049 A1* | 3/2014 | Armstrong-Muntner | | |
| | | | | H04N 23/62 |
| | | | | 345/619 |
| 2016/0109709 A1* | 4/2016 | Osterhout | | G02B 27/0172 |
| | | | | 359/614 |
| 2018/0012560 A1* | 1/2018 | Yuan | | G09G 5/10 |
| 2018/0088323 A1* | 3/2018 | Bao | | G02B 27/017 |
| 2019/0041644 A1* | 2/2019 | Abele | | G02B 27/0172 |
| 2020/0013349 A1* | 1/2020 | Lee | | G09G 3/3406 |
| 2020/0098335 A1 | 3/2020 | Chen et al. | | |
| 2020/0413028 A1* | 12/2020 | Tsau | | G02B 27/017 |
| 2021/0018966 A1* | 1/2021 | Stanley | | G02B 27/0176 |
| 2021/0243346 A1* | 8/2021 | Bhatia | | G09G 5/10 |
| 2022/0147142 A1* | 5/2022 | Bui | | G09G 3/3406 |

OTHER PUBLICATIONS

"International Application Serial No. PCT/US2022/032175, Written Opinion dated Sep. 26, 2022", 9 pgs.

* cited by examiner

ADAPTIVE BRIGHTNESS FOR AUGMENTED REALITY DISPLAY

CROSS REFERENCE TO RELATED APPLICATION

This application claims the benefit of priority to U.S. Provisional Application Ser. No. 63/208,810, filed on Jun. 9, 2021 and entitled "ADAPTIVE BRIGHTNESS FOR AUGMENTED REALITY DISPLAY." The contents of this prior application are considered part of this application, and are hereby incorporated by reference herein in its entirety.

TECHNICAL FIELD

The present disclosure relates generally to wearable devices with display systems. Specifically, the present disclosure addresses systems and methods for using digital light projectors for augmented reality wearable devices.

BACKGROUND

A wearable device may be implemented with a transparent or semi-transparent display through which a user of the wearable device can view the surrounding environment. Such devices enable a user to see through the transparent or semi-transparent display to view the surrounding environment, and to also see objects (e.g., virtual objects such as images, video, text, etc.) that are generated for display to appear as a part of, and/or overlaid upon, the surrounding environment.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
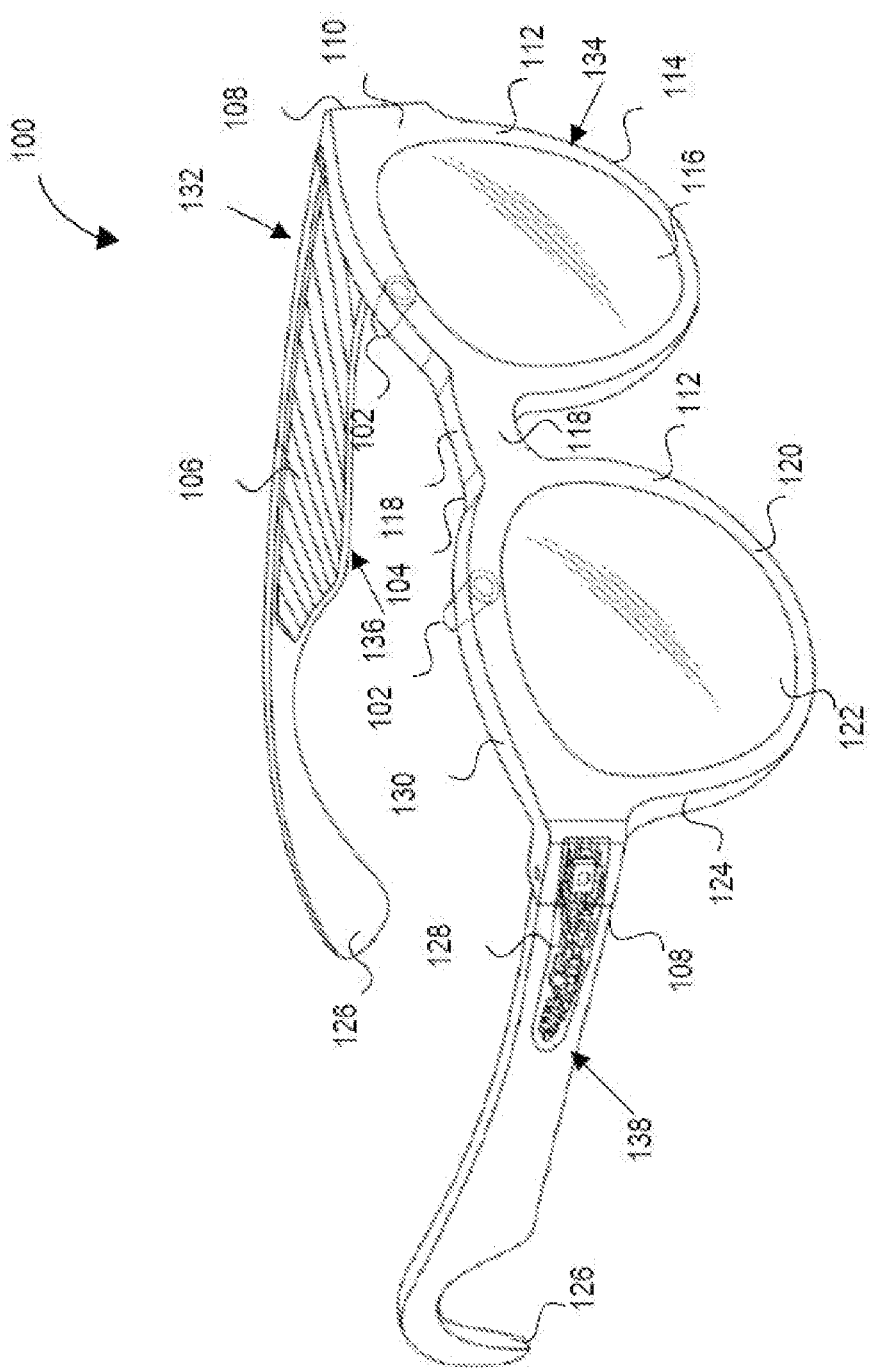
FIG. 1 is a perspective view of a wearable device, in accordance with some examples.

The description that follows describes systems, methods, techniques, instruction sequences, and computing machine program products that illustrate examples of the present subject matter. In the following description, for purposes of explanation, numerous specific details are set forth in order to provide an understanding of various examples of the present subject matter. It will be evident, however, to those skilled in the art, that examples of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

An AR wearable device implemented with a transparent or semi-transparent display enables a user to see through the transparent or semi-transparent display to view the surrounding environment. In addition, the AR wearable device may enable the user to see objects (e.g., virtual objects such as images, video, text, etc.) that are rendered in the display of the AR wearable device to appear as a part of, and/or overlaid upon, the surrounding environment. Such an AR wearable device may provide an augmented reality experience for the user.

The rendering of the virtual object may be based on a position of the wearable device relative to a physical object or relative to a frame of reference (external to the wearable device) so that the virtual object correctly appears in the display. The virtual object appears aligned with a physical object as perceived by the user of the AR wearable device. Graphics (e.g., graphical elements containing instructions and guides) appear to be attached to a physical object of interest. In order to do this, the AR wearable device detects the physical object and tracks a pose of the AR wearable device relative to a position of the physical object. A pose identifies a position and orientation of the object relative to a frame of reference or relative to another object.

In one example, the AR wearable device includes a projector (e.g., Digital Light Projector (DLP)) that displays the virtual object on a display of the AR wearable device (e.g., lenses of the AR wearable device). DLP projectors operate by projecting a light from a light source (e.g., one or more LEDs, such as red, green and blue LEDs) through a color wheel towards a DMD (Digital Micromirror Device). The DMD controls whether to reflect the colored light towards the display of the AR wearable device. DLP projectors create color for the human eye by cycling through (R)ed, (G)reen, (B)lue bit-planes at very high rates (e.g., 10 kHz). The sum of all bit-planes creates the impression of color for the human eye. The order of showing the bit-planes is optimized for each DLP projector individually (in terms of power and colors). As such, different DLP projectors will have different color cycle arrangements. Furthermore, depending on the frame rate of a DLP projector, the DLP projector repeats the bit plane sequence to fill the frame time (e.g., cycled). As such, each DLP projector is typically configured to optimize the bit-plane sequence (for power saving, color calibration, reduction of the rainbow artifacts (for wall projectors)).

In some implementations, AR wearable devices using DLP projectors encounter difficulty of operating on environments with large variations in ambient brightness—from dark indoor lighting to bright outdoor lighting (i.e., a park outdoors or a dimly lit restaurant). In such cases, the AR wearable device displays objects with a perceived brightness (effective brightness value) that matches the ambient lighting conditions of the operating environment while also reducing the amount of power used and maintaining high contrast ratio. Some AR wearable devices can modify brightness of the projected image by repeating RGB bit planes that are projected, such as by projecting an RGBRGB bit plane (e.g., repeating the same RGB pixel values twice)—this is referred to as 0% dark time. This can result in greater effective brightness but can cause image ghosting and color breakup. In order to avoid the image ghosting and color breakup, the AR wearable devices can introduce a short blanking period, such as by projecting an RGB bit plane followed by a dark (all black—no light) bit plane— this is referred to as 50% dark time. This approach can address the image ghosting and color breakup effects but cannot reach the same high levels of brightness even though it can achieve lower levels of brightness than the 0% dart time.

The disclosed system and methods include operations for configuring an operation of a DLP projector for use in an AR wearable device based on a measure ambient light received from an ambient light sensor of the AR wearable device. The disclosed systems can dynamically switch between 0% dark time, 50%/o dark time and can modify pixel values in software to achieve a desired effective brightness level (a maximum brightness level available using 0% dark time or a minimum brightness level available using 50% dark time) without introducing image ghosting or color breakup. By being able to sense the ambient brightness (measure of ambient light) and control the LED current, the projector dark time, and the RGB composition of the projection, in combination, the AR wearable device can adapt to a wide range of ambient light in different real-world environments while maintaining a desired perceived brightness and power savings.

FIG. 1 is perspective view of an AR wearable device (e.g., AR eyeglasses or AR glasses 100), in accordance with some examples. The AR glasses 100 can include a frame 132 made from any suitable material such as plastic or metal, including any suitable shape memory alloy. In one or more examples, the frame 132 includes a front piece 134 including a first optical left optical element holder 114 (e.g., a display or lens holder) and a second or right optical element holder 120 connected by a bridge 118. The front piece 134 additionally includes a left end portion 110 and a right end portion 124. A first or left optical element 116 and a second or right optical element 122 can be provided within respective left optical element holder 114 and right optical element holder 120. The optical elements 116 and 122 can be tinted (where a tint layer is placed on top of the lens or glass that makes up the optical elements 116 and 122) or clear (where no tint layer is placed). Each of the right optical element 122 and the left optical element 116 can be a lens, a display, a display assembly or a combination of the foregoing. Any of the display assemblies disclosed herein can be provided in the AR glasses 100.

The frame 132 additionally includes a left arm or temple piece 136 and a right arm or temple piece 138 coupled to the respective left end portion 110 and the right end portion 124 of the front piece 134 by any suitable means such as a hinge (not shown), so as to be coupled to the front piece 134, or rigidly or fixably secured to the front piece 134 so as to be integral with the front piece 134. In one or more implementations, each of the temple piece 136 and the temple piece 138 includes a first portion 108 that is coupled to the respective left end portion 110 or right end portion 124 of the front piece 134 and any suitable second portion 126 for coupling to the ear of the user. In one example, the front piece 134 can be formed from a single piece of material, so as to have a unitary or integral construction. In one example, such as illustrated in FIG. 1, the entire frame 132 can be formed from a single piece of material so as to have a unitary or integral construction.

The AR glasses 100 can include a computing device, such as a computer 128, which can be of any suitable type so as to be carried by the frame 132 and, in one or more examples, of a suitable size and shape, so as to be at least partially disposed in one of the temple piece 136 and the temple piece 138. In one or more examples, as illustrated in FIG. 1, the computer 128 is sized and shaped similar to the size and shape of one of the temple piece 138 (e.g., or the temple piece 136), and is thus disposed almost entirely if not entirely within the structure and confines of such temple piece 138. In one or more examples, the computer 128 is disposed in both of the temple piece 136 and the temple piece 138. The computer 128 can include one or more processors with memory, wireless communication circuitry, and a power source. As discussed below, the computer 128 comprises low-power circuitry, high-speed circuitry, and a display processor. Various other examples may include these elements in different configurations or integrated together in different ways. Additional details of aspects of computer 128 may be implemented as illustrated by the wearable device 210 discussed below. In some aspects, the computer 128 implements the DLP controller, discussed below.

The computer 128 additionally includes a battery 106 or other suitable portable power supply. In one example, the battery 106 is disposed in one of the temple piece 136 or the temple piece 138. In the AR glasses 100 shown in FIG. 1, the battery 106 is shown as being disposed in left temple piece 136 and electrically coupled using the connection 130 to the remainder of the computer 128 disposed in the right temple piece 138. The AR glasses 100 can include a connector or port (not shown) suitable for charging the battery 106 accessible from the outside of frame 132, a wireless receiver, transmitter, or transceiver (not shown) or a combination of such devices.

In one or more implementations, the AR glasses 100 include cameras 102. Although two cameras are depicted, other examples contemplate the use of a single or additional (i.e., more than two) cameras. In one or more examples, the glasses 100 include any number of input sensors (e.g., one or more ambient light sensors) or peripheral devices in addition to the cameras 102. The front piece 134 is provided with an outward facing, forward-facing or front or outer surface 112 that faces forward or away from the user when the glasses 100 are mounted on the face of the user, and an opposite inward-facing, rearward-facing or rear or inner surface 104 that faces the face of the user when the glasses 100 are mounted on the face of the user. Such sensors can include inwardly-facing video sensors or digital imaging modules such as cameras that can be mounted on or provided within the inner surface 104 of the front piece 134 or elsewhere on the frame 132 so as to be facing the user, and outwardly-facing video sensors or digital imaging modules such as the cameras 102 that can be mounted on or provided with the outer surface 112 of the front piece 134 or elsewhere on the frame 132 so as to be facing away from the user. Such sensors, peripheral devices or peripherals can additionally include biometric sensors, location sensors, ambient light sensors, thermal temperature sensors, or any other such sensors.

Figure 2:
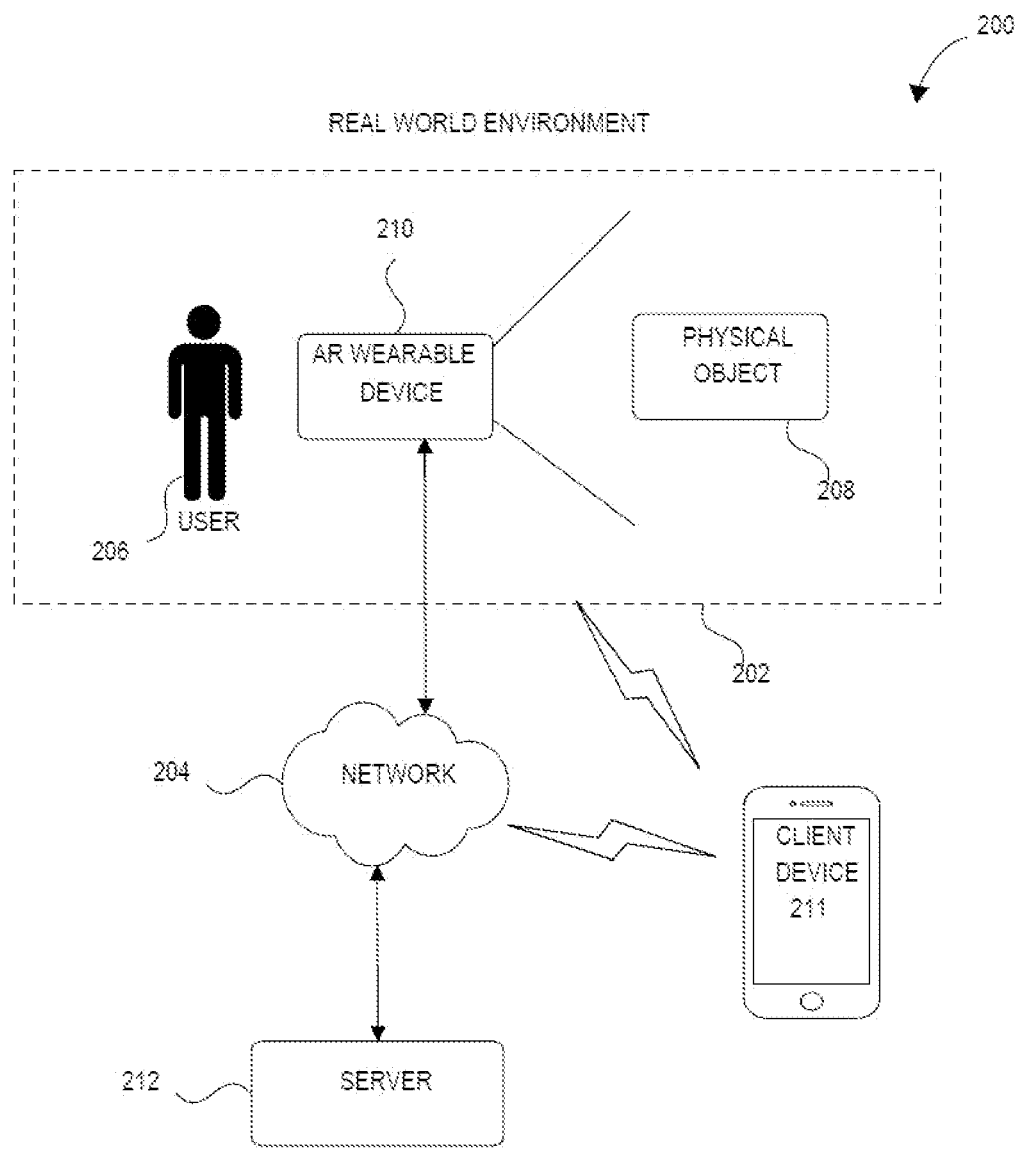
FIG. 2 is a block diagram illustrating a network environment for operating an Augmented Reality (AR) wearable device in accordance with one example.

FIG. 2 is a network diagram illustrating a network environment 200 suitable for operating an AR wearable device 210, according to some examples. The network environment 200 includes an AR wearable device 210, a client device 211, and a server 212, communicatively coupled to each other directly or via a network 204. The AR wearable device 210 and the server 212 may each be implemented in a computer system, in whole or in part, as described below with respect to FIGS. 8 and 9. The server 212 may be part of a network-based system. For example, the network-based system may be or include a cloud-based server system that provides additional information, such as virtual content (e.g., images of three-dimensional models of virtual objects) to the AR wearable device 210.

The client device 211 may be a smartphone, tablet, phablet, laptop computer, access point, or any other such device capable of connecting with the wearable device 210 using both a low-power wireless connection and a high-speed wireless connection. The client device 211 is connected to the server 212 and the network 204. The network 204 may include any combination of wired and wireless connections. The server 212 may be one or more computing devices as part of a service or network computing system. The client device 211 and any elements of the server 212 and network 204 may be implemented using details of the software architecture 704 or the machine 800 described in FIGS. 8 and 9. The client device 211 can provide one or more images for display to the AR wearable device 210. The client device 211 can receive input from a user (e.g., by moving a slider between a minimum and maximum brightness setting positions) to adjust a brightness setting of the AR wearable device 210. In response, the client device 211 transmits to the AR wearable device 210 a brightness value set by the user based on the received input. In such cases, the AR wearable device 210 sets the effective brightness value to the setting indicated by the client device 211 independent of any ambient light measurements received from the ambient light sensor.

A user 206 operates the AR wearable device 210. The user 206 may be a human user (e.g., a human being), a machine user (e.g., a computer configured by a software program to interact with the AR wearable device 210), or any suitable combination thereof (e.g., a human assisted by a machine or a machine supervised by a human). The user 206 is not part of the network environment 200 but is associated with the AR wearable device 210.

The AR wearable device 210 may be a computing device with a display such as a smartphone, a tablet computer, or a wearable computing device (e.g., AR glasses or head-mounted display device). The computing device may be hand-held or may be removable mounted to a head of the user 206. In one example, the display may be a screen that displays what is captured with a camera of the AR wearable device 210. In another example, the display of the device may be transparent such as in lenses of wearable computing glasses. In another example, the display of the AR wearable device 210 may be represent an image received from the client device 211, such as by using one or more projection elements operated by a DLP controller.

The user 206 operates an application of the AR wearable device 210. The application may include an AR application configured to provide the user 206 with an experience triggered by a physical object 208, such as a two-dimensional physical object (e.g., a picture), a three-dimensional physical object (e.g., a statue), a location (e.g., in a facility), or any references (e.g., perceived corners of walls or furniture) in the real-world physical environment. For example, the user 206 may point a camera of the AR wearable device 210 to capture an image of the physical object 208. The image is tracked and recognized locally in the AR wearable device 210 using a local context recognition dataset module of the AR application of the AR wearable device 210. The local context recognition dataset module may include a library of virtual objects associated with real-world physical objects or references. The AR application then generates additional information corresponding to the image (e.g., a three-dimensional model) and presents this additional information, as one or more images, in a display of the AR wearable device 210 in response to identifying the recognized image. If the captured image is not recognized locally at the AR wearable device 210, the AR wearable device 210 downloads additional information (e.g., the three-dimensional model) corresponding to the captured image, from a database of the server 212 over the network 204 or from the client device 211.

In one example, the server 212 may be used to detect and identify the physical object 208 based on sensor data (e.g., image and depth data) from the AR wearable device 210, determine a pose of the AR wearable device 210 and the physical object 208 based on the sensor data. The server 212 can also generate a virtual object based on the pose of the AR wearable device 210 and the physical object 208. The server 212 communicates the virtual object to the AR wearable device 210. The object recognition, tracking, and AR rendering can be performed on either the AR wearable device 210, the server 212, or a combination between the AR wearable device 210 and the server 212.

Any of the machines, databases, or devices shown in FIG. 1 may be implemented in a general-purpose computer modified (e.g., configured or programmed) by software to be a special-purpose computer to perform one or more of the functions described herein for that machine, database, or device. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 204 may be any network that enables communication between or among machines (e.g., server 212), databases, and devices (e.g., AR wearable device 210). Accordingly, the network 204 may be a wired network, a wireless network (e.g., a mobile, BLUETOOTH, short-range network, or long-range network, or cellular network), or any suitable combination thereof. The network 204 may include one or more portions that constitute a private network, a public network (e.g., the Internet), or any suitable combination thereof.

Figure 3:
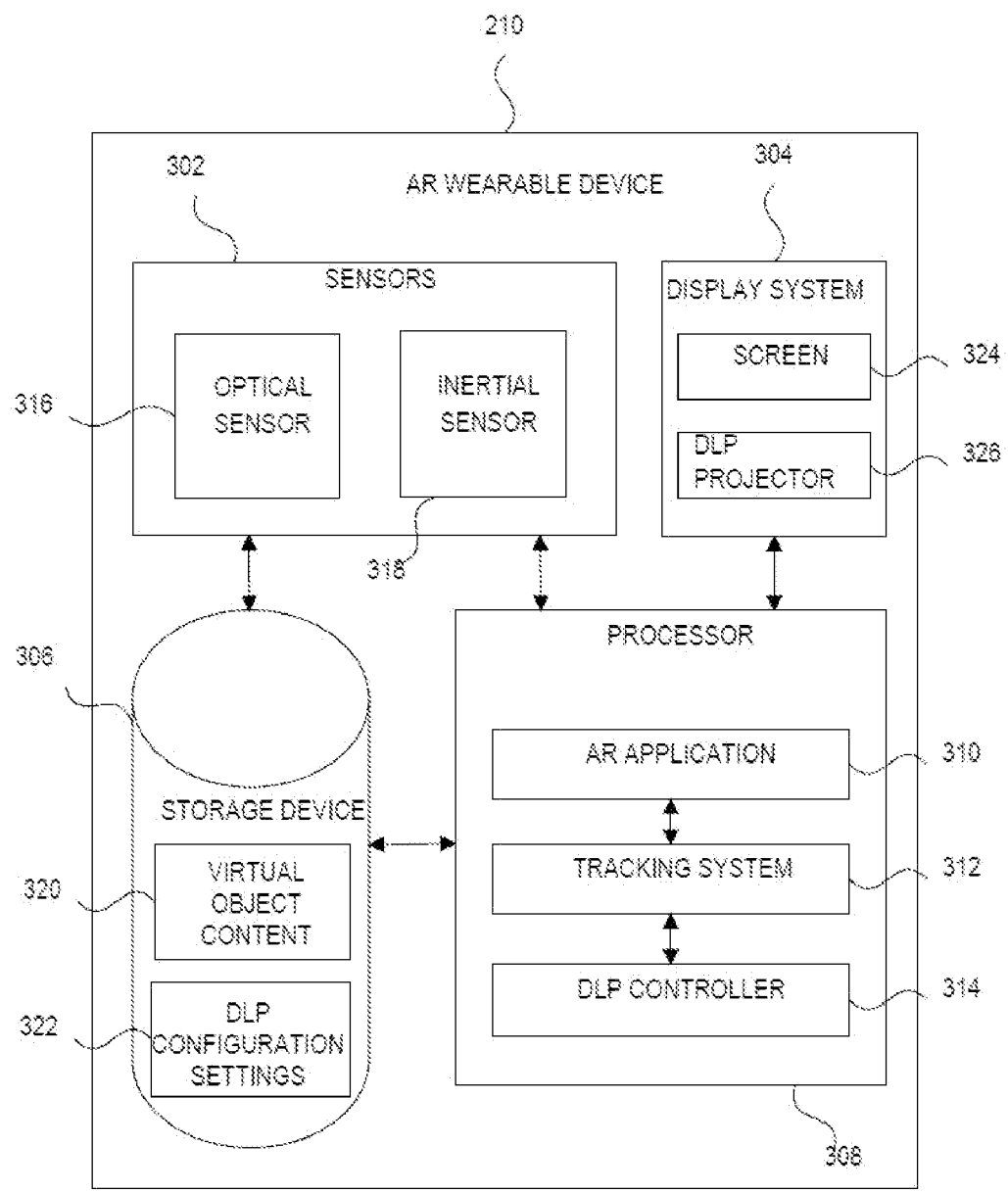
FIG. 3 is a block diagram illustrating an AR wearable device in accordance with one example.

FIG. 3 is a block diagram illustrating modules (e.g., components) of the AR wearable device 210, according to some examples. The AR wearable device 210 includes sensors 302, a display system 304, a processor 308, and a storage device 306. Examples of AR wearable device 210 include a wearable computing device, AR glasses, AR eyeglasses, a desktop computer, a vehicle computer, a tablet computer, a navigational device, a portable media device, or a smart phone.

The sensors 302 include, for example, an optical sensor 316 (e.g., camera such as a color camera, a thermal camera, a depth sensor and one or multiple grayscales, global shutter tracking cameras) and an inertial sensor 318 (e.g., gyroscope, accelerometer). Other examples of sensors 302 include a proximity or location sensor (e.g., near field communication, GPS, Bluetooth, Wi-Fi), ambient light sensor, a thermal temperature sensor, an audio sensor (e.g., a microphone), or any suitable combination thereof. It is noted that the sensors 302 described herein are for illustration purposes and the sensors 302 are thus not limited to the ones described above.

The display system 304 includes a screen 324 and a DLP projector 326. The DLP projector 326 includes one or more projection elements (LEDs) that project an image of a virtual object on the screen 324. In one example, the screen 324 may be transparent or semi-opaque so that the user 206 can see through the screen 324 (in AR use case). The DLP projector 326 is configured to operate with a predictable color sequence, a single RGB color cycle per frame, and a shorter pixel persistence. The DLP projector 326 is described in more detail below with respect to FIG. 4.

The processor 308 includes an AR application 310, a tracking system 312, and a DLP controller 314. The AR application 310 detects and identifies a physical environment or the physical object 208 using computer vision. The AR application 310 (which can be partially implemented by the client device 211) retrieves a virtual object (e.g., 3D object model) based on the identified physical object 208 or physical environment. The AR application 310 renders the virtual object in the display system 304. For an AR application, the AR application 310 includes a local rendering engine that generates a visualization of a virtual object overlaid (e.g., superimposed upon, or otherwise displayed in tandem with) on an image of the physical object 208 captured by the optical sensor 316. A visualization of the virtual object may be manipulated by adjusting a position of the physical object 208 (e.g., its physical location, orientation, or both) relative to the optical sensor 316. Similarly, the visualization of the virtual object may be manipulated by adjusting a pose of the AR wearable device 210 relative to the physical object 208.

In one example, the AR application 310 includes a brightness control application. The brightness control application receives a measure of ambient light from an ambient light sensor (e.g., sensors 302) and adjusts one or more hardware parameters of the projection elements of the AR wearable device (e.g., DLP projector 326) based on the measure of ambient light. The AR application 310 modifies one or more color values of the image displayed by the projection elements of the AR wearable device based on the measure of ambient light and projects the image with the modified color values using the projection elements of the AR wearable device with the adjusted one or more hardware parameters. In an example, the AR application 310 computes an effective brightness value based on the measure of ambient light which is used to control the adjustments to the one or more hardware parameters and the one or more color values. In some examples, as part of computing the effective brightness value, the AR application 310 selects between operating the projection elements of the DLP projector 326 with a 0% Dark Time (DT) or a 50% DT.

The tracking system 312 tracks the pose (e.g., position and orientation) of the AR wearable device 210 relative to the real world environment 202 using optical sensors (e.g., depth-enabled 3D camera, image camera), inertia sensors (e.g., gyroscope, accelerometer), wireless sensors (Bluetooth, Wi-Fi), GPS sensor, and/or audio sensor to determine the location of the AR wearable device 210 within the real world environment 202. The tracking system 312 includes, for example, accesses inertial sensor data from the inertial sensor 318, optical sensor data from the optical sensor 316, and determines its pose based on the combined inertial sensor data and the optical sensor data. In another example, the tracking system 312 determines a pose (e.g., location, position, orientation) of the AR wearable device 210 relative to a frame of reference (e.g., real world environment 202). In another example, the tracking system 312 includes a visual odometry system that estimates the pose of the AR wearable device 210 based on 3D maps of feature points from the inertial sensor data and the optical sensor data.

The DLP controller 314 communicates data signals to the DLP projector 326 to project the virtual content (including one or more images) onto the screen 324 (e.g., transparent display). The DLP controller 314 includes a hardware that converts signals from the AR application 310 to display signals for the DLP projector 326. In one example, the DLP controller 314 is part of the processor 308. In another example, the DLP controller 314 is part of the DLP projector 326.

In one example, the DLP controller 314 configures the DLP projector 326 to operate with a predictable color sequence, a single RGB color cycle per frame, and a shorter pixel persistence. For example, the DLP controller 314 determines or identifies the color sequence pattern of the DLP projector 326. The DLP controller 314 directs the light source (or a color filter system) of the DLP projector 326 to produce a single color cycle per frame. The DLP controller 314 also directs a Digital Micro-mirror Device (DMD) of the DLP projector 326 to generate a shorter pixel persistence. The DLP controller 314 is described in more detail below with respect to FIG. 5.

The storage device 306 stores virtual object content 320 and DLP configuration settings 322. The virtual object content 320 includes, for example, a database of visual references (e.g., images) and corresponding experiences (e.g., three-dimensional virtual objects, interactive features of the three-dimensional virtual objects). In one example, the storage device 306 includes a primary content dataset, a contextual content dataset, and a visualization content dataset. The primary content dataset includes, for example, a first set of images and corresponding experiences (e.g., interaction with three-dimensional virtual object models). For example, an image may be associated with one or more virtual object models. The primary content dataset may include a core set of images. The core set of images may include a limited number of images identified by the server 212. For example, the core set of images may include the images depicting covers of the ten most viewed physical objects and their corresponding experiences (e.g., virtual objects that represent the ten most viewed physical objects). In another example, the server 212 may generate the first set of images based on the most popular or often scanned images received at the server 212. Thus, the primary content dataset does not depend on physical objects or images obtained by the optical sensor 316.

The DLP configuration settings 322 include, for example, effective brightness values, settings for the DLP projector 326 and/or determined by the DLP controller 314. Example of settings include RGB bit-planes cycle rate, frame rate, color sequence, brightness values, and pixel persistence time.

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various examples, modules described herein as being implemented within a single machine, database, or device may be distributed across multiple machines, databases, or devices.

Figure 4:
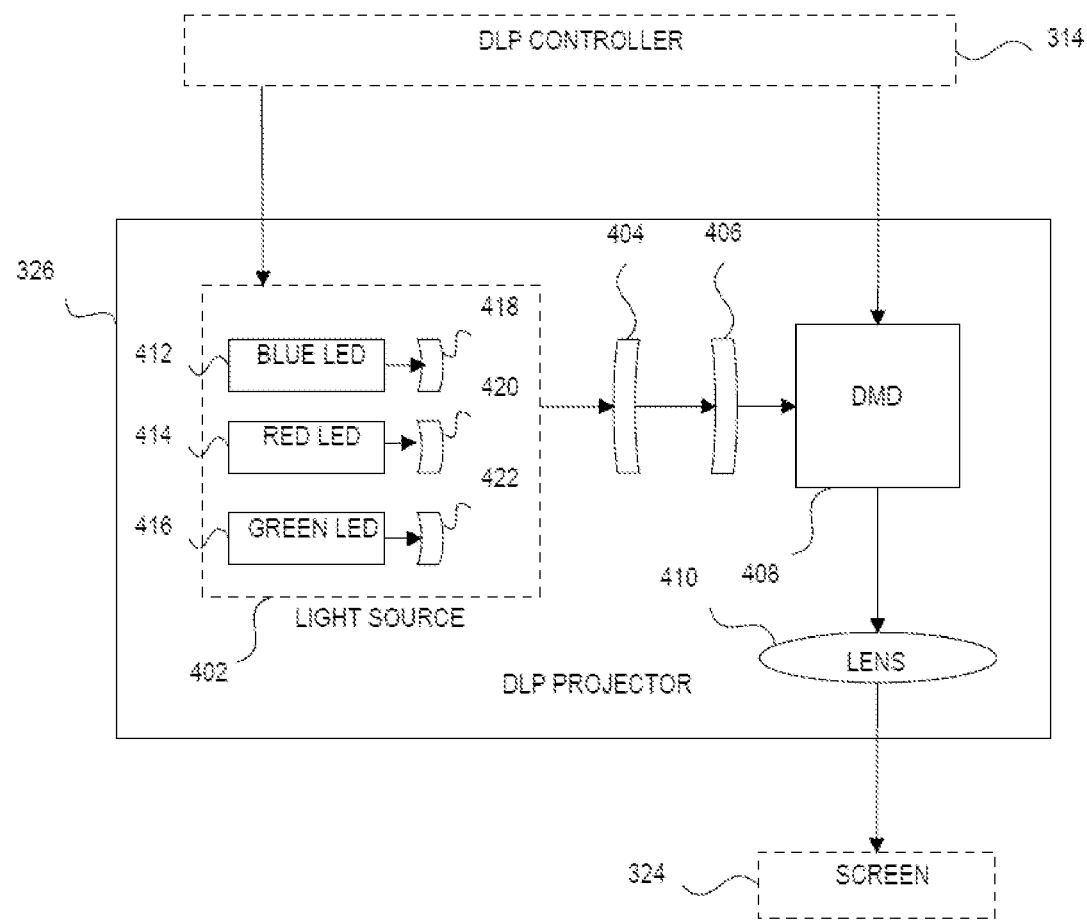
FIG. 4 is a block diagram illustrating a DLP projector of the AR wearable device in accordance with one example.

FIG. 4 is a block diagram illustrating the DLP projector 326 in accordance with one example. The DLP controller 314 includes a light source 402 (also referred to as light source component or projection elements), a condensing lens 404, a shaping lens 406, a DMD 408, and a projection lens 410. The light source 402 includes, for example, a pressurized light bulb, a laser, or a high-powered LED. In one example, the light source 402 includes three colored LEDs: a blue LED 412, a red LED 414, and a green LED 416. Each colored LED emits a colored light at its corresponding collimating lens (e.g., collimating lens 418, collimating lens 420, collimating lens 422) according to its corresponding hardware parameter.

The DLP controller 314 interfaces with the light source 402 of the DLP projector 326 and controls the light source 402 to generate a single RGB repetition per frame. In one example, the DLP controller 314 interfaces with the light source 402 and identifies the color sequence of the light source 402. For example, the DLP controller 314 queries the DLP projector 326 and identifies a model of the DLP projector 326. The DLP controller 314 identifies the color sequence of the light source 402 based on the model of the DLP projector 326.

In another example, the light source 402 includes for example, a white light source (not shown) and a color wheel (not shown) that is divided into primary colors (red, green, and blue). The color wheel rotates at a high speed (e.g., 7200 RPM). The DLP controller 314 synchronizes the rotating motion of the color wheel so that the green component is displayed on the DMD when the green section of the color wheel is in front of the lamp. The same is true for the red, blue and other sections. The colors are displayed sequentially at a sufficiently high rate that the observer sees a composite (full color) image. Black color is produced by directing unused light away from the light source 402. For example, the unused light is scattered to reflect and dissipate on the interior walls of the DMD 408 or projection lens 410. The DLP controller 314 operates the light source 402 so that the color wheel rotates one RGB cycle per frame.

The condensing lens 404 focuses the light from the light source 402 onto the shaping lens 406. The shaping lens 406 diffuses the light from the light source 402 to the DMD 408. The DMD 408 includes hundreds of individual micromirrors. Digital signals that represent 0 and 1 drive those micromirrors to rotate to selected angles to reflect unnecessary light, and direct the required light to the projection lens 410. Through persistence of visual, lights of different colors are synthesized to become a colored image to the human eyes. In one example, the DLP controller 314 controls the DMD 408 to reduce persistence of each pixel. Persistence may be referred to as the time each pixel remains lit. High persistence (e.g., 8.3 ms at 120 Hz) causes blurring and smearing of the images. The DLP controller 314 reduces the persistence of each pixel to, for example, less than 3 ms.

Figure 5:
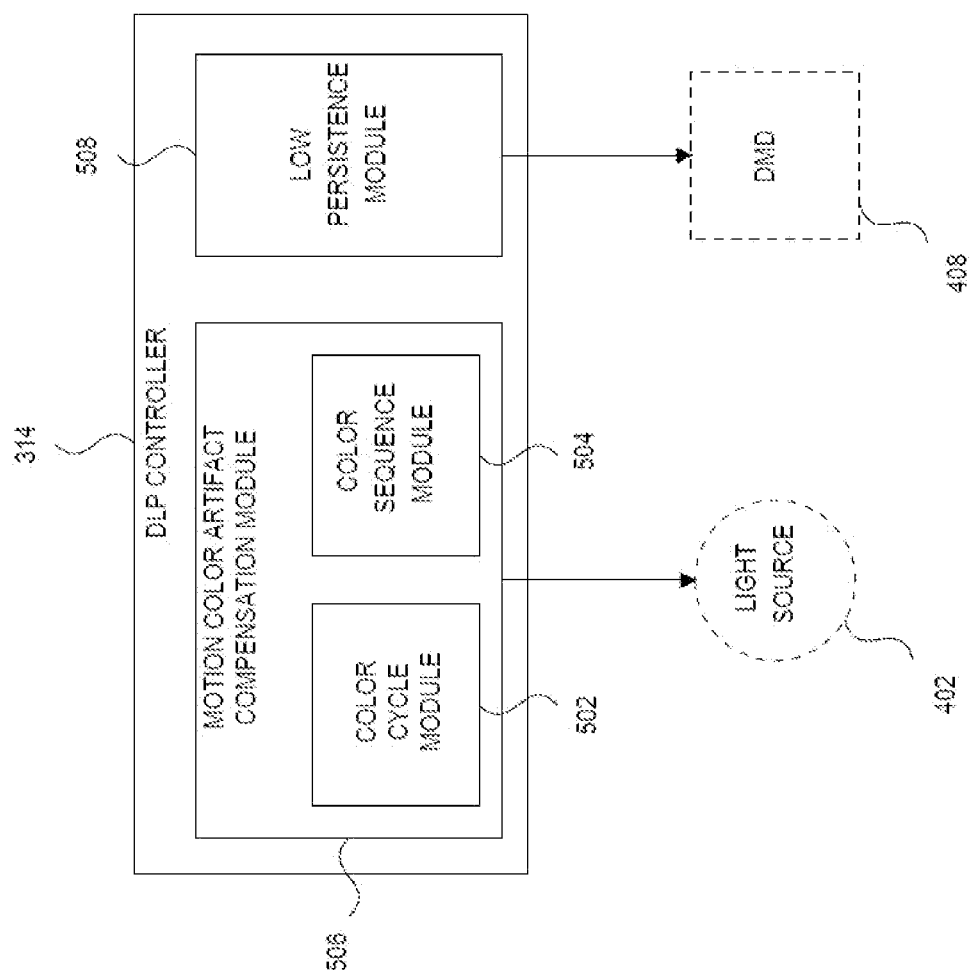
FIG. 5 is a block diagram illustrating a DLP controller in accordance with one example.

FIG. 5 illustrates the DLP controller 314 in accordance with one example. The DLP controller 314 includes a motion color artifact compensation module 506 and a low persistence module 508. The motion color artifact compensation module 506 reduces the color artifact produced by a motion of the AR wearable device 210. For example, as the user 206 moves his head (with the AR wearable device 210 mounted to his head) a displayed virtual content will break up in its base colors (RGB), more precisely the color sequence will become visible.

DLP projectors utilizing a mechanical spinning color wheel exhibit this color break up also known as the "rainbow effect". This is best described as brief flashes of perceived red, blue, and green "shadows" observed most often when the projected content features high contrast areas of moving bright or white objects on a mostly dark or black background. Brief visible separation of the colors can also be apparent when the viewer moves their eyes quickly across the projected image. Typically, the fast the user moves his eyes/head, the further apart the color appear.

The motion color artifact compensation module 506 reduces or eliminates the rainbow effect by compensating for color artifact based on predictable data. In other words, the motion color artifact compensation module 506 predicts where and how to render colors under user motion, and compensates motion-to-photon latency on a per color basis. In one example, the motion color artifact compensation module 506 includes a color cycle module 502 and a color sequence module 504.

The color cycle module 502 configures the light source 402 to generate only one single repetition of the base colors (RGB) per image frame. For example, a conventional light source 402 produces four color RGB-RGB-RGB-RGB (e.g., at about 60 Hz) per frame. The multiple color cycles result in stutter effects because the picture is seen four times at different positions. This stutter effect is especially exacerbated during head motion of the AR wearable device 210 while virtual content is displayed.

The color sequence module 504 identifies or determines a color sequence of the light source 402. As previously described, in a conventional DLP projector, as the user moves his head, a displayed virtual content will break up in its base colors, more precisely the color sequence will become visible. For example, a simple RGB sequence will bleed its three colors. The faster the user moves his head, the further apart the colors will appear. High frequency color sequences can be used to offset the color bleeding. However, the high frequency can lead to motion blur and unreadable text. The color sequence module 504 identifies the color sequence (R, G, and B) of the light source 402 and counters the effect of the color breakup based on the predicted color sequence for each frame.

The low persistence module 508 reduces persistence of each pixel by controlling the DMD 408 to direct light from the light source 402 away from the projection lens 410. In one example, the low persistence module 508 reduces the persistence of each pixel to, for example, less than 3 ms. In another example, the DLP controller 314 controls the DMD 408 to show black (direct the light away from the projection lens 410) 50% of the frame time, resulting in a shifting of individual color planes.

In addition, the DLP controller 314 can control the current for each LED of the light source 402 providing a range of possible brightness. However, the current range provided can limit the upper or lower bound of LED brightness. In some examples, a current range is provided that will provide a maximum LED brightness to achieve a perceive brightness corresponding to an outdoor ambient brightness. This can lead to a lower perceived brightness bound that is still greater than an indoor ambient brightness which results in a projection that is too bright to be comfortable for the user in an indoor setting. Therefore, a process of turning off the projector for a period of time (i.e., dark time) can be leveraged to achieve a lower perceived brightness in an indoor setting while maintaining the capability of achieving a maximum perceived brightness (i.e., through max current and 0% dark time) in outdoor settings. Still, other methods can be leveraged. For instance, an RGB compositor can vary the tonality and color spectrum for any given color to be displayed in order to increase or lower the perceived brightness of the color. Alone or in combination each of these methods allows an AR wearable device to operate in a wide range of ambient brightness while maintaining a low power consumption and extending battery life.

In an example, the DLP controller 314 can operate the LEDs of the light source 402 in either a 0% dark time (DT) mode or a 50% DT mode. In the 0% DT mode, the DLP controller 314 performs two repetitions for each desired color (e.g., RGBRGB). Also, the DLP controller 314 can drive the LEDs with a maximum amount of current in the 0% DT mode. This results in a maximum achievable effective brightness setting. In such an implementation, the 0% DT mode also consumes a maximum amount of power. In order to reduce the amount of power and brightness, the DLP projector 326 can operate the LEDs of the light source 402 in a 50% DT mode. In the 50% DT mode, the DLP projector 326 performs one repetition for each desired color (e.g., RGB, Dark, Dark, Dark). Namely, in this mode, the LEDs are driven at half of the number of repetitions as the 0% DT mode. In order to achieve the same level of effective or perceived brightness in the 50% DT mode as the 0% DT mode, the current used to drive the LEDs needs to be doubled. However, certain projection elements of the light source 402 cannot be driven at such a high current without damaging components.

One advantage of operating the LEDs of the light source 402 at the 50% DT mode is that a lower level of minimum perceived brightness than the 0% DT mode can be achieved. Namely, driving the LEDs at the minimum operating current in the 50% DT mode results in a lower effective brightness that is perceived than when the LEDs are driven by the same minimum operating current in the 0% DT mode. According to some implementations, the DLP projector 326 can select between operating the LEDs of the light source 402 in the 0% DT mode or in the 50% DT mode depending on the effective brightness value that is desired or computed for a given real-world environment. In addition, the DLP projector 326 can also modify the color values of the pixels of the image that is received for display in the AR wearable device 210 in order to further reduce or increase the effective brightness value that is perceived. By using a combination of modifying the hardware parameters of the LEDs (e.g., changing the DT operating mode and modifying current used to drive the LEDs) and modifying software pixel values (e.g., changing a white color to a grey color pixel in an image, or scaling or multiplying the red, green, blue pixel values of the image by a specified value) based on current ambient light measurements, the effective brightness that is perceived by a user through the AR wearable device 210 can be more effectively set for different real-world environments, including bright outdoor environments and darker indoor environment. This allows the AR wearable device 210 to be used in a wider range of environments without negatively impacting the overall user experience.

In some examples, the DLP controller 314 receives a measure of ambient light from an ambient light sensor of the AR wearable device 210. The measure of ambient light can be received in a Lux (lx) unit of measure which is used as one component of the effective brightness setting that is computed by the DLP controller 314. In one example, the DLP controller 314 can change or control the effective brightness setting of the AR wearable device 210 automatically. In one example, the DLP controller 314 can change or control the effective brightness setting of the AR wearable device 210 based on manual input control (e.g., based on inputs received from a user directly on the AR wearable device 210 or from an application implemented on a client device 211 that is in communication with the AR wearable device 210). The effective brightness setting can be specified between a range of 0 (a minimum brightness value) and 255 (a maximum brightness value). The maximum brightness value can be reduced in certain implementations based on a current thermal temperature of the AR wearable device (e.g., from 255 to a value that is 80% of the maximum brightness value, such as 204) when the current thermal temperature is above or transgresses a specified threshold. When the current thermal temperature returns to being below the specified threshold, the maximum brightness value returns to the default value, such as 255.

In an example, the DLP controller 314 determines that the measure of ambient light is less than a first threshold (e.g., 10 lx). In such cases, the DLP controller 314 sets the effective brightness setting to a first value that is 30% of the maximum brightness setting. The DLP controller 314 can determine that the measure of ambient light is in a first range (e.g., between 10 lx and 200 lx). In such cases, the DLP controller 314 can compute the effective brightness setting as an interpolation between the first value (e.g., that is 30% of the maximum brightness setting) and a second value (e.g., that is 100% of the maximum brightness setting). As an example, the DLP controller 314 can compute a difference between the current measure of brightness and the first threshold. Then, the DLP controller 314 can compute the effective brightness value by linearly interpolating between the first and second values based on the computed difference. For example, the DLP controller 314 can determine that the current measure of ambient light is 50 lx and, in such cases, the DLP controller 314 can compute the effective brightness value to be 39% of the maximum brightness setting (a linear interpolation from 30% to 100% based on a difference indicating an increase relative to the first threshold of 40 lx). The DLP controller 314 can determine that the measure of ambient light exceeds the maximum value of the first range (e.g., is greater than 200 lx). In such cases, the DLP controller 314 can set the effective brightness setting to be the second value (e.g., 100% of the maximum brightness setting).

In some examples, the DLP controller 314 can compute the effective brightness value based on whether the lenses of the AR wearable device 210 are tinted or clear. Specifically, the DLP controller 314 can determine that the lenses are tinted. In such cases, the DLP controller 314 can determine that the measure of ambient light is less than the first threshold (e.g., 10 lx). In response, the DLP controller 314 sets the effective brightness setting to a particular value, such as 0% of the maximum brightness setting. The DLP controller 314 can determine that the measure of ambient light is in a second range (e.g., between 25 lx and 300 lx). In such cases, the DLP controller 314 can compute the effective brightness setting as an interpolation between the particular value (e.g., that is 0% of the maximum brightness setting) and a second value (e.g., that is 100% of the maximum brightness setting). As an example, the DLP controller 314 can compute a difference between the current measure of brightness and the first threshold. Then, the DLP controller 314 can compute the effective brightness value by linearly interpolating between the first and second values based on the computed difference. For example, the DLP controller 314 can determine that the current measure of ambient light is 50 lx and, in such cases, the DLP controller 314 can compute the effective brightness value to be 39% of the maximum brightness setting (a linear interpolation from 30% to 100% based on a difference indicating an increase relative to the first threshold of 40 lx). The DLP controller 314 can determine that the measure of ambient light exceeds the maximum value of the second range (e.g., is greater than 200 lx or 300 lx). In such cases, the DLP controller 314 can set the effective brightness setting to be the second value (e.g., 100% of the maximum brightness setting).

As another example, the DLP controller 314 can determine that the lenses are clear. In such cases, the DLP controller 314 can determine that the measure of ambient light is less than a second threshold (e.g., 25 lx) that can be set to be greater than the first threshold used when the lenses are determined to be tinted. Namely, the DLP controller 314 can select between a first threshold (associated with tinted lenses) and a second threshold (associated with clear lenses) from a plurality of thresholds used to control the effective brightness based on ambient light measurements. In response to selecting the second threshold, the DLP controller 314 sets the effective brightness setting to a particular value, such as 0% of the maximum brightness setting when the ambient light measure is less than the second threshold. The DLP controller 314 can determine that the measure of ambient light is in a third range (e.g., between 10 lx and 200 lx). In such cases, the DLP controller 314 can compute the effective brightness setting as an interpolation between the particular value (e.g., that is 0% of the maximum brightness setting) and a second value (e.g., that is 100% of the maximum brightness setting). As an example, the DLP controller 314 can compute a difference between the current measure of brightness and the second threshold. Then, the DLP controller 314 can compute the effective brightness value by linearly interpolating between the first and second values based on the computed difference. For example, the DLP controller 314 can determine that the current measure of ambient light is 50 lx and, in such cases, the DLP controller 314 can compute the effective brightness value to be 39% of the maximum brightness setting (a linear interpolation from 30% to 100% based on a difference indicating an increase relative to the second threshold of 40 lx). The DLP controller 314 can determine that the measure of ambient light exceeds the maximum value of the second range (e.g., is greater than 200 lx or 300 lx). In such cases, the DLP controller 314 can set the effective brightness setting to be the second value (e.g., 100% of the maximum brightness setting).

In some implementations, the DLP controller 314 can compute the effective brightness setting for the AR wearable device 210 by obtaining a minimum between a screen brightness offset by an animation scale (which can be set between 0 and 1) and a thermal limit of the AR wearable device 210. Namely, if the screen brightness computed in the manner discussed above (e.g., based on user input or based on measurements of the ambient light received from the ambient light sensor) are lower than the maximum brightness associated with the thermal limit, the DLP controller 314 sets the brightness setting to be the brightness value computed based on user input or based on measurements of the ambient light received from the ambient light sensor. If the screen brightness computed in the manner discussed above is greater than or transgresses the maximum brightness associated with the thermal limit, the DLP controller 314 sets the brightness setting to be the thermal limit value (e.g., 80% of the maximum brightness value or any number between 80% and 100%).

In some implementations, the DLP controller 314 varies the projector LED current, the mode of operation (e.g., 50% DT (50-DT) or 0% DT (0-DT)), and the composition of the image RGB values based on the computed effective brightness setting. An illustrative manner in which the DLP controller 314 varies these parameter is summarized in the below table:

TABLE 1 hardware and software modifications to control brightness

| Effective Brightness Computed | Projector LED Current | Projector Operating Mode | Image RGB Scale |
|---|---|---|---|
| 100% | Maximum Current | 0-DT | 100% |
| Less than 100% | Maximum Current | 50-DT | 100% |
| Between 100% and 80% | Linearly scale current based on effective brightness value | 50-DT | 100% |
| 80% | Minimum Current | 50-DT | 100% |
| Between 80% and 0% | Minimum Current | 50-DT | Linearly scale RGB values of the image |
| Greater than 0% | Minimum Current | 50-DT | 0% |
| 0% | No Current | 50-DT | 0% |

Specifically, the DLP controller 314 can access ambient temperate measurements to compute an effective brightness value or can receive input from a user that sets the effective brightness value. In response to determining that the effective brightness value is set to the maximum brightness setting (e.g., 100%), the DLP controller 314 can drive the projection elements (e.g., LEDs) of the projector with the maximum current and set the operating mode to 0% DT. In this case, the DLP controller 314 may output the image on the AR wearable device 210 with the received RGB values (e.g., without scaling the RGB values). In some cases, the DLP controller 314 can determine that the effective brightness value is set to a brightness amount that is between 80% and 100%. In such cases, the DLP controller 314 can drive the projection elements (e.g., LEDs) of the projector with a linearly scaled current relative to the maximum current. Namely, the lower the effective brightness level that is computed to be between 80% and 100%, the lower linearly the current is scaled to be (e.g., if the effective brightness level is reduced from 100% to 95%, which is a 5% drop, the DLP controller 314 reduces the current by 5%). The DLP controller 314 can set the operating mode to 50% DT and may output the image on the AR wearable device 210 with the received RGB values (e.g., without scaling the RGB values).

In some cases, the DLP controller 314 can determine that the effective brightness value is set to a brightness amount that is between 80% and 0% (or a value slightly greater than 0%). In such cases, the DLP controller 314 can drive the projection elements (e.g., LEDs) of the projector with a minimum current and can set the operating mode to 50% DT. The DLP controller 314 can also linearly scale the RGB values of the image on the AR wearable device 210. Namely, the DLP controller 314 can modify values of the received image prior to displaying the image on the display of the AR wearable device 120 by scaling the RGB values based on the amount that the effective brightness is lowered relative to 80%. For example, the RGB values can be linearly scaled by a first value if the effective brightness is computed to be 60% and can be linearly scaled by a second value (lower than the first value) if the effective brightness is computed to be 40%. The lowest brightness is achieved by driving the LEDs with no current, setting the operating mode to be 50-DT, and scaling the RGB values of the image by 0%.

Figure 6:
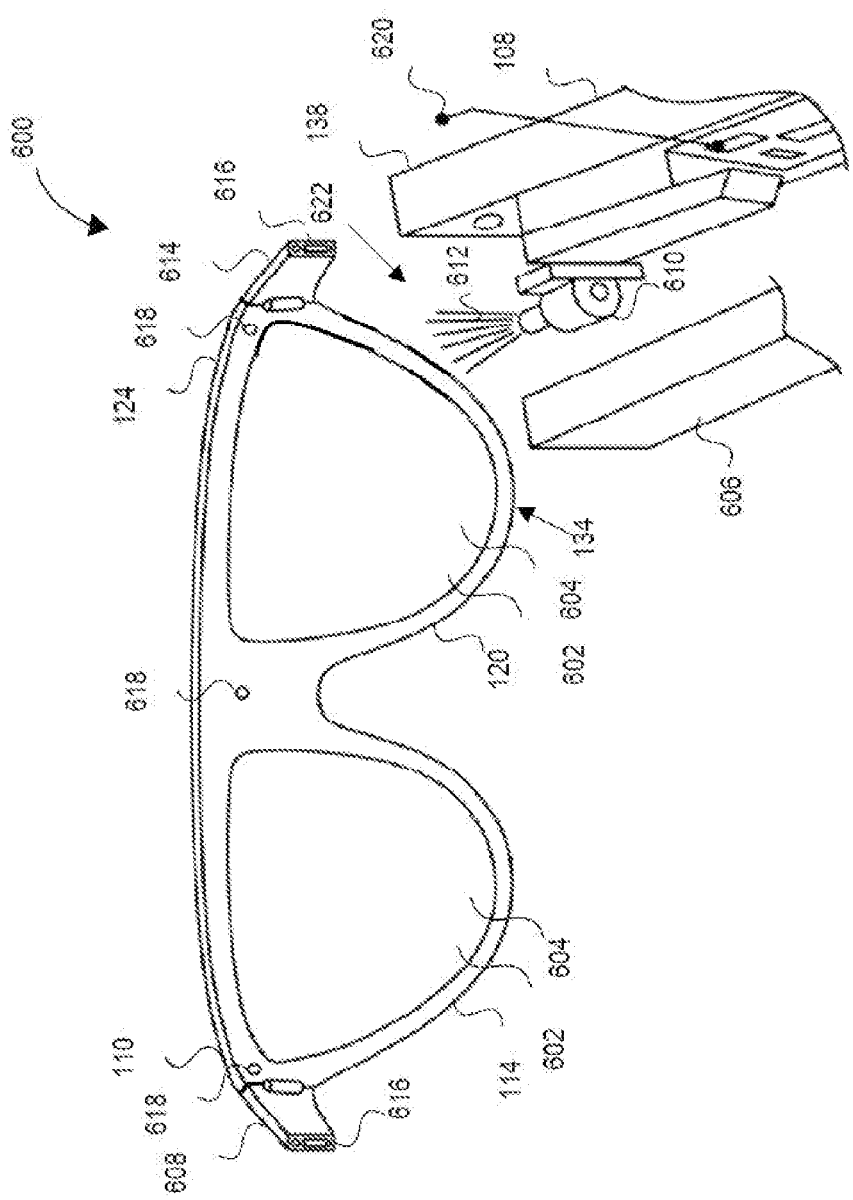
FIG. 6 illustrates an AR wearable device in accordance with some examples.

FIG. 6 illustrates a wearable device (e.g., glasses 600) in accordance with some examples. The glasses 600 can be of any suitable type, including the glasses 100, and like reference numerals have been used to describe like components of glasses 600 and glasses 100. For simplicity, a portion of the glasses 600 are shown in FIG. 6. The glasses 600 include optical lenses 602 secured within each of the left optical element holder 114 and the right optical element holder 120. Each of the optical lenses 602 has a respective front surface (not shown) and an opposite rear surface 604. The left end portion 110 and the right end portion 124 of the front piece 134 can include a respective left frame extension 608 and a right frame extension 614 that extend rearward from the respective left end portion 110 and right end portion 124. As discussed above with respect to FIG. 1, the left temple piece 136 (not shown in FIG. 6) and the right temple piece 138 can be provided, and can either be fixedly secured to the respective frame extension 608 and frame extension 614 or removably attachable to the respective frame extension 608 and frame extension 614. In one or more examples, connector mechanisms 616 are provided for securing the temple piece 136 and the temple piece 138 to the respective frame extension 608 and frame extension 614.

The glasses 600 include a computer 620 (e.g., computing system), which may be similar to the computer 128 or the machine 800. In the example of FIG. 6, the computer 620 is powered by a suitable rechargeable battery (not shown), which can be similar to the battery 106. The computer 620 may be implemented using the one or more of the processor elements of the AR wearable device 210, including the processor 308, and/or the storage device 306.

The glasses 600 further includes sensors 618 (e.g., one or more cameras, ambient light sensors), which may be similar to the optical sensor 316 and/or other digital sensors, and may face inward (e.g., toward the user) and/or outward (e.g., away from the user). Data feeds from the sensors 618 are provided to the computer 620. In the example of FIG. 6, the computer 620 is disposed within the first portion 108 of right temple piece 138, although the computer 620 could be disposed elsewhere in alternative examples. In the example of FIG. 6, the right temple piece 138 includes a removable cover section 606 for access to the connector mechanisms 616 or other electronic components of the glasses 600.

The glasses 600 include an optical assembly 622 for displaying images to a user. In the example of FIG. 6, one optical assembly 622 is shown, but in other examples, optical assemblies may be provided for both eyes of a user (e.g., for both of the temple piece 136 and the temple piece 138). The optical assembly 622 includes an optical source such as a projector 610 that is disposed in one of the arms or temples of the glasses (e.g., the right temple piece 136 of the glasses 600). In one or more examples, the projector 610 is a three-color laser projector using a scanning mirror or galvanometer. The computer 620 connects to the projector 610.

Figure 7:
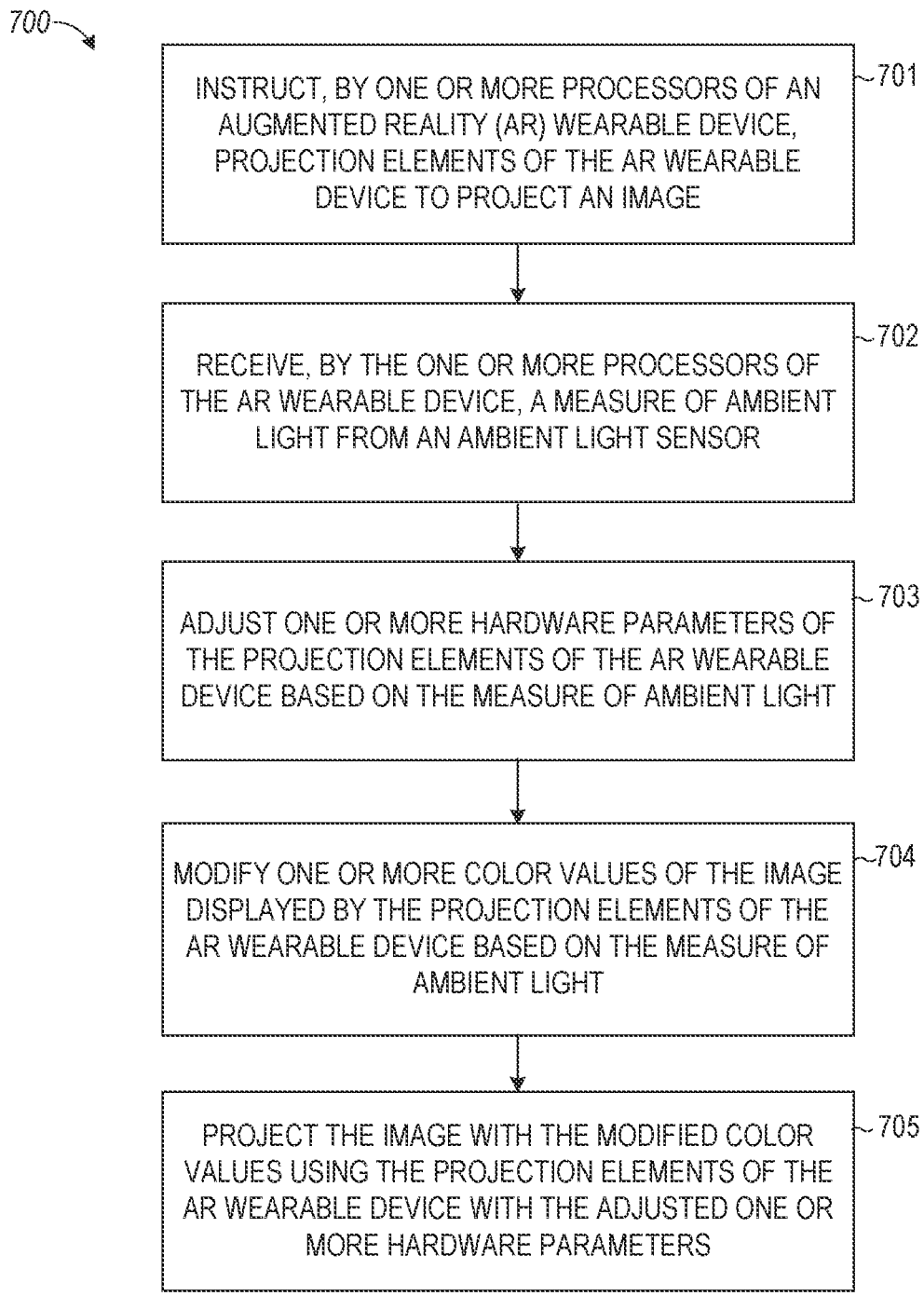
FIG. 7 is a flowchart illustrating example operations of the DLP controller, in accordance with some examples.

FIG. 7 is a flowchart of a process 700, in accordance with some examples. Although the flowchart can describe the operations as a sequential process, many of the operations can be performed in parallel or concurrently. In addition, the order of the operations may be re-arranged. A process is terminated when its operations are completed. A process may correspond to a method, a procedure, and the like. The steps of methods may be performed in whole or in part, may be performed in conjunction with some or all of the steps in other methods, and may be performed by any number of different systems or any portion thereof, such as a processor included in any of the systems.

At operation 701, the DLP controller 314 instructs projection elements of the AR wearable device to project an image, as discussed above.

At operation 702, the DLP controller 314 receives a measure of ambient light from an ambient light sensor, as discussed above.

At operation 703, the DLP controller 314 adjusts one or more hardware parameters of the projection elements of the AR wearable device based on the measure of ambient light, as discussed above.

At operation 704, the DLP controller 314 modifies one or more color values of the image displayed by the projection elements of the AR wearable device based on the measure of ambient light, as discussed above.

At operation 705, the DLP controller 314 projects the image with the modified color values using the projection elements of the AR wearable device with the adjusted one or more hardware parameters, as discussed above.

Machine Architecture

Figure 8:
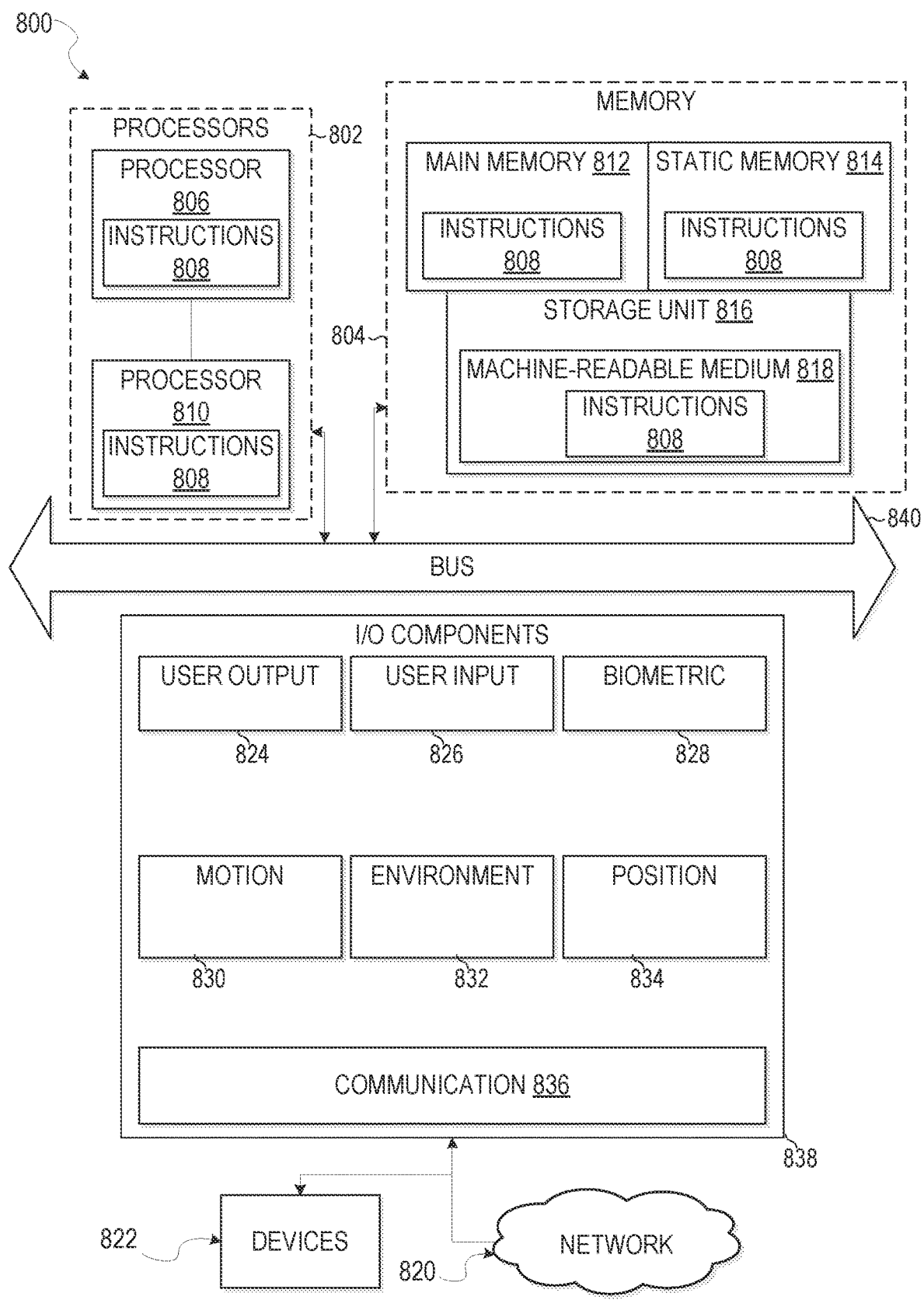
FIG. 8 is a diagrammatic representation of a machine in the form of a computer system within which a set of instructions may be executed for causing the machine to perform any one or more of the methodologies discussed herein, in accordance with some examples.

FIG. 8 is a diagrammatic representation of the machine 800 within which instructions 808 (e.g., software, a program, an application, an applet, an app, or other executable code) for causing the machine 800 to perform any one or more of the methodologies discussed herein may be executed. For example, the instructions 808 may cause the machine 800 to execute any one or more of the methods described herein. The instructions 808 transform the general, non-programmed machine 800 into a particular machine 800 programmed to carry out the described and illustrated functions in the manner described. The machine 800 may operate as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 808, sequentially or otherwise, that specify actions to be taken by the machine 800. Further, while only a single machine 800 is illustrated, the term "machine" shall also be taken to include a collection of machines that individually or jointly execute the instructions 808 to perform any one or more of the methodologies discussed herein. The machine 800, for example, may comprise the client device 102 or any one of a number of server devices forming part of the messaging server system 108. In some examples, the machine 800 may also comprise both client and server systems, with certain operations of a particular method or algorithm being performed on the server-side and with certain operations of the particular method or algorithm being performed on the client-side.

The machine 800 may include processors 802, memory 804, and input/output (I/O) components 838, which may be configured to communicate with each other via a bus 840. In an example, the processors 802 (e.g., a Central Processing Unit (CPU), a Reduced Instruction Set Computing (RISC)

Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 806 and a processor 810 that execute the instructions 808. The term "processor" is intended to include multi-core processors that may comprise two or more independent processors (sometimes referred to as "cores") that may execute instructions contemporaneously. Although FIG. 8 shows multiple processors 802, the machine 800 may include a single processor with a single-core, a single processor with multiple cores (e.g., a multi-core processor), multiple processors with a single core, multiple processors with multiples cores, or any combination thereof.

The memory 804 includes a main memory 812, a static memory 814, and a storage unit 816, all accessible to the processors 802 via the bus 840. The main memory 804, the static memory 814, and the storage unit 816 store the instructions 808 embodying any one or more of the methodologies or functions described herein. The instructions 808 may also reside, completely or partially, within the main memory 812, within the static memory 814, within a machine-readable medium within the storage unit 816, within at least one of the processors 802 (e.g., within the processor's cache memory), or any suitable combination thereof, during execution thereof by the machine 800.

The I/O components 838 may include a wide variety of components to receive input, provide output, produce output, transmit information, exchange information, capture measurements, and so on. The specific I/O components 838 that are included in a particular machine will depend on the type of machine. For example, portable machines such as mobile phones may include a touch input device or other such input mechanisms, while a headless server machine will likely not include such a touch input device. It will be appreciated that the I/O components 838 may include many other components that are not shown in FIG. 8. In various examples, the I/O components 838 may include user output components 824 and user input components 826. The user output components 824 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 826 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 838 may include biometric components 828, motion components 830, environmental components 832, or position components 834, among a wide array of other components. For example, the biometric components 828 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 830 include acceleration sensor components (e.g., accelerometer), gravitation sensor components, rotation sensor components (e.g., gyroscope).

The environmental components 832 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera, and a depth sensor, for example.

The position components 834 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 838 further include communication components 836 operable to couple the machine 800 to a network 820 or devices 822 via respective coupling or connections. For example, the communication components 836 may include a network interface component or another suitable device to interface with the network 820. In further examples, the communication components 836 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 822 may be another machine or any of a wide variety of peripheral devices (e.g., a peripheral device coupled via a USB).

Moreover, the communication components 836 may detect identifiers or include components operable to detect identifiers. For example, the communication components 836 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 836, such as location via Internet Protocol (IP) geolocation, location via Wi-Fi® signal triangulation, location via detecting an NFC beacon signal that may indicate a particular location, and so forth.

The various memories (e.g., main memory 812, static memory 814, and memory of the processors 802) and storage unit 816 may store one or more sets of instructions and data structures (e.g., software) embodying or used by any one or more of the methodologies or functions described herein. These instructions (e.g., the instructions 808), when executed by processors 802, cause various operations to implement the disclosed examples.

The instructions 808 may be transmitted or received over the network 820, using a transmission medium, via a network interface device (e.g., a network interface component included in the communication components 836) and using any one of several well-known transfer protocols (e.g., hypertext transfer protocol (HTTP)). Similarly, the instructions 808 may be transmitted or received using a transmission medium via a coupling (e.g., a peer-to-peer coupling) to the devices 822.

Software Architecture

Figure 9:
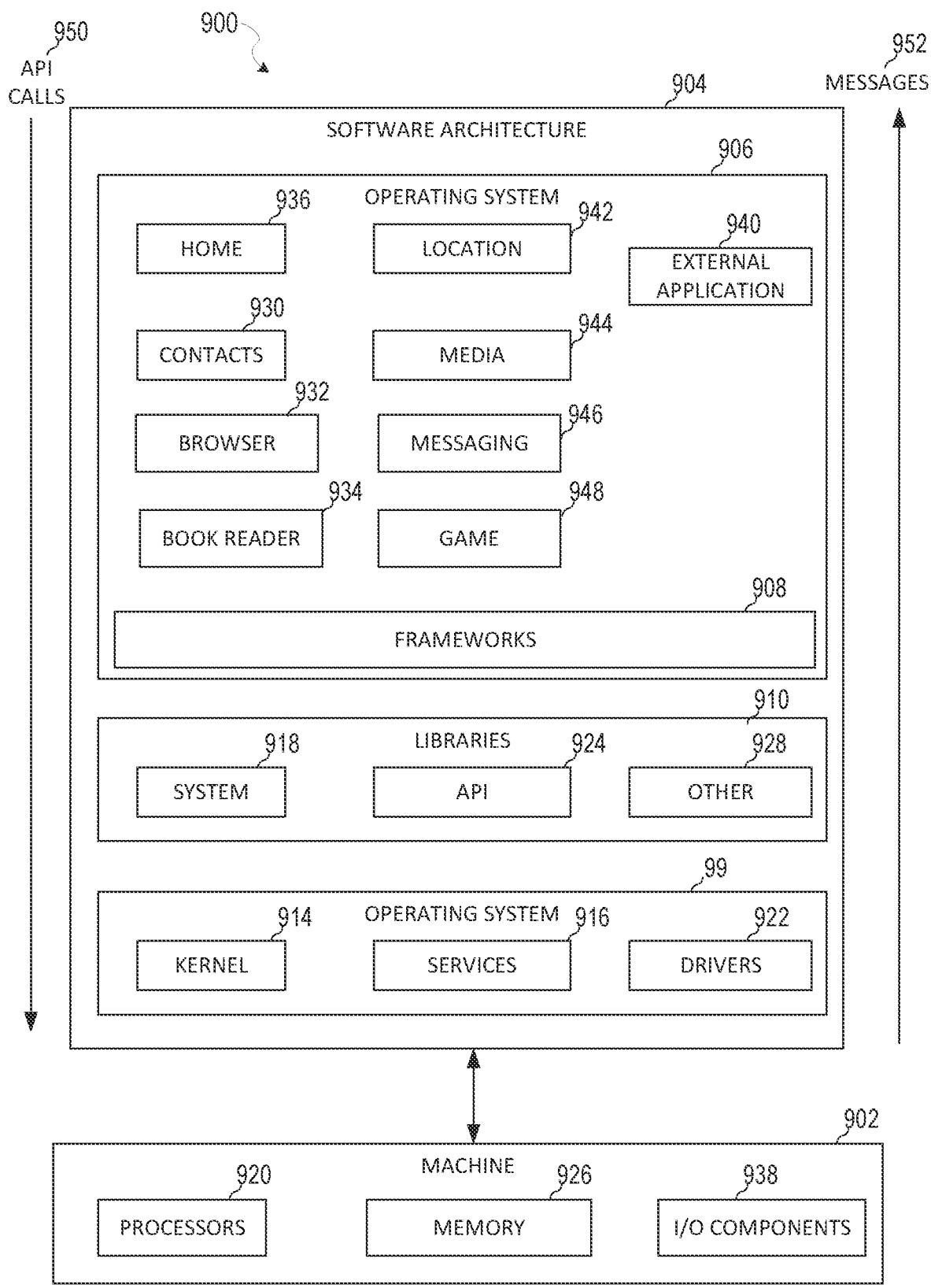
FIG. 9 is a block diagram showing a software architecture within which examples may be implemented.

FIG. 9 is a block diagram 900 illustrating a software architecture 904, which can be installed on any one or more of the devices described herein. The software architecture 904 is supported by hardware such as a machine 902 that includes processors 920, memory 926, and I/O components 938. In this example, the software architecture 904 can be conceptualized as a stack of layers, where each layer provides a particular functionality. The software architecture 904 includes layers such as an operating system 912, libraries 910, frameworks 908, and applications 906. Operationally, the applications 906 invoke API calls 950 through the software stack and receive messages 952 in response to the API calls 950.

The operating system 912 manages hardware resources and provides common services. The operating system 912 includes, for example, a kernel 914, services 916, and drivers 922. The kernel 914 acts as an abstraction layer between the hardware and the other software layers. For example, the kernel 914 provides memory management, processor management (e.g., scheduling), component management, networking, and security settings, among other functionality. The services 916 can provide other common services for the other software layers. The drivers 922 are responsible for controlling or interfacing with the underlying hardware. For instance, the drivers 922 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 910 provide a common low-level infrastructure used by the applications 906. The libraries 910 can include system libraries 918 (e.g., C standard library) that provide functions such as memory allocation functions, string manipulation functions, mathematic functions, and the like. In addition, the libraries 910 can include API libraries 924 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 910 can also include a wide variety of other libraries 928 to provide many other APIs to the applications 906.

The frameworks 908 provide a common high-level infrastructure that is used by the applications 906. For example, the frameworks 908 provide various graphical user interface (GUI) functions, high-level resource management, and high-level location services. The frameworks 908 can provide a broad spectrum of other APIs that can be used by the applications 906, some of which may be specific to a particular operating system or platform.

In an example, the applications 906 may include a home application 936, a contacts application 930, a browser application 932, a book reader application 934, a location application 942, a media application 944, a messaging application 946, a game application 948, and a broad assortment of other applications such as an external application 940. The applications 906 are programs that execute functions defined in the programs. Various programming languages can be employed to create one or more of the applications 906, structured in a variety of manners, such as object-oriented programming languages (e.g., Objective-C, Java, or C++) or procedural programming languages (e.g., C or assembly language). In a specific example, the external application 940 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the external application 940 can invoke the API calls 950 provided by the operating system 912 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 802 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A method comprising:
    causing, by one or more processors of an augmented reality (AR) wearable device, projection elements of the AR wearable device to project an image;
    receiving, by the one or more processors of the AR wearable device, a measure of ambient light from an ambient light sensor;
    adjusting one or more hardware parameters of projection elements of the AR wearable device based on the measure of the ambient light;
    selecting an operating mode between operating the projection elements with a first quantity of Dark Time (DT) or a second quantity of DT based on an effective brightness value computed as a function of the measure of ambient light, the first and second quantities of DT controlling how many times colors are repeated by the projection elements, such that a number of times colors are repeated when operating the projection elements with the first quantity of DT differs from the number of times colors are repeated when operating the projection elements with the second quantity of DT;
    modifying one or more color values of an image projected by the projection elements of the AR wearable device according to the selected operating mode; and
    causing projection of an image with modified one or more color values using the projection elements of the AR wearable device with the adjusted one or more hardware parameters.

2. The method of claim 1, wherein the AR wearable device comprises electronic eyeglasses.

3. The method of claim 1, the first quantity of DT comprises 50% DT and the second quantity of DT comprises 0% DT.

4. The method of claim 3, further comprising:
    receiving input from a user to adjust a brightness setting on an application implemented on a mobile device associated with the AR wearable device, the effective brightness being computed independently of the ambient light in response to receiving an input from the user.

5. The method of claim 3, further comprising:
    determining that lenses of the AR wearable device comprise a tinted lens or clear lens;
    selecting a first threshold from a plurality of thresholds for setting a screen brightness value based on determining that lenses of the AR wearable device comprise the tinted lens; and
    selecting a second threshold from a plurality of thresholds for setting the screen brightness value based on determining that lenses of the AR wearable device comprise the clear lens.

6. The method of claim 5, further comprising:
    in response to determining that the lenses of the AR wearable device comprise the tinted lens, the AR wearable device:
    compares the measure of the ambient light to the first threshold of the plurality of thresholds; and
    sets the screen brightness value to given value based on comparing the measure of ambient light to the first threshold.

7. The method of claim 5, wherein computing the effective brightness value comprises:
    in response to determining that the lenses of the AR wearable device comprise the clear lens, the AR wearable device:
    compares the measure of ambient light to the second threshold of the plurality of thresholds; and sets the screen brightness value to given value based on comparing the measure of ambient light to the second threshold.

8. The method of claim 3, further comprising computing the effective brightness value, wherein the one or more hardware parameters are adjusted and the one or more color values are modified based on the effective brightness value.

9. The method of claim 1, further comprising:
in response to determining that the measure of ambient light is less than a first threshold, the AR wearable devices sets a screen brightness value to zero;
in response to determining that the measure of ambient light greater than the first threshold and is within a range of values, the AR wearable devices sets the screen brightness value to an interpolation between a minimum and maximum value; and
in response to determining that the measure of ambient light is greater than a second threshold, the AR wearable devices sets the screen brightness value to the maximum value.

10. The method of claim 1, further comprising:
determining that a thermal limit of the AR wearable device has been reached; and
preventing the effective brightness value from exceeding a maximum brightness value associated with the thermal limit.

11. The method of claim 10, wherein the maximum brightness value comprises 80% or less.

12. The method of claim 10, wherein the effective brightness value is computed as a minimum of a screen brightness value computed based on the measure of ambient light and the maximum brightness value associated with the thermal limit.

13. The method of claim 1, further comprising:
determining that the effective brightness value is within a first range of values; and
in response to determining that the effective brightness value is within the first range of values, varying light emitting diode (LED) current values of the projection elements between a maximum current and a minimum current linearly.

14. The method of claim 1, further comprising:
determining that the effective brightness value is below a first range of values; and
in response to determining that the effective brightness value is below the first range of values, the AR wearable device multiplies red, green, and blue pixel values of the image by a specified value.

15. The method of claim 1, wherein the projection elements are operated with the second quantity of DT in response to determining that the effective brightness value is a maximum effective brightness value, a current being driven to the projection elements at a maximum value.

16. The method of claim 1, wherein the projection elements are operated with the first quantity of DT in response to determining that the effective brightness value is less than a maximum effective brightness value and greater than a second value, a current being driven to the projection elements at linear range between minimum and maximum values, wherein red, green, and blue pixel values of the image linearly scaled down.

17. The method of claim 1, wherein the projection elements are operated with the first quantity of DT in response to determining that the effective brightness value corresponds to a specified value, a current being driven to the projection elements at linear range corresponds to a minimum value, wherein red, green, and blue pixel values of the image are multiplied by 0.

18. A system comprising:
one or more processors of an augmented reality (AR) wearable device configured to perform operations comprising:
causing projection elements of the AR wearable device to project an image;
receiving a measure of ambient light from an ambient light sensor;
adjusting one or more hardware parameters of the projection elements of the AR wearable device based on the measure of ambient light;
selecting an operating mode between operating the projection elements with a first quantity of Dark Time (DT) or a second quantity of DT based on an effective brightness value computed as a function of the measure of ambient light, the first and second quantities of DT controlling how many times colors are repeated by the projection elements, such that a number of times colors are repeated when operating the projection elements with the first quantity of DT differs from the number of times colors are repeated when operating the projection elements with the second quantity of DT;
modifying one or more color values of an image projected by the projection elements of the AR wearable device according to the selected operating mode; and
causing projection of the image with the modified one or more color values using the projection elements of the AR wearable device with the adjusted one or more hardware parameters.

19. The system of claim 18, wherein the projection elements are operated with the second quantity of DT in response to determining that the effective brightness value is a maximum effective brightness value, a current being driven to the projection elements at a maximum value.

20. A non-transitory computer-readable medium comprising instructions that, when executed by one or more processors of an augmented reality (AR) wearable device, configure the AR wearable device to perform operations comprising:
causing projection elements of the AR wearable device to project an image;
receiving a measure of ambient light from an ambient light sensor;
adjusting one or more hardware parameters of the projection elements of the AR wearable device based on the measure of ambient light;
selecting an operating mode between operating the projection elements with a first quantity of Dark Time (DT) or a second quantity of DT based on an effective brightness value computed as a function of the measure of ambient light, the first and second quantities of DT controlling how many times colors are repeated by the projection elements, such that a number of times colors are repeated when operating the projection elements with the first quantity of DT differs from the number of times colors are repeated when operating the projection elements with the second quantity of DT;
modifying one or more color values of an image projected by the projection elements of the AR wearable device according to the selected operating mode; and
causing projection of the image with the modified one or more color values using the projection elements of the AR wearable device with the adjusted one or more hardware parameters.

* * * * *